C. B. HOWELL.
RIM EXPANDING AND CONTRACTING TOOL.
APPLICATION FILED MAR. 28, 1918.
1,317,136.
Patented Sept. 23, 1919.
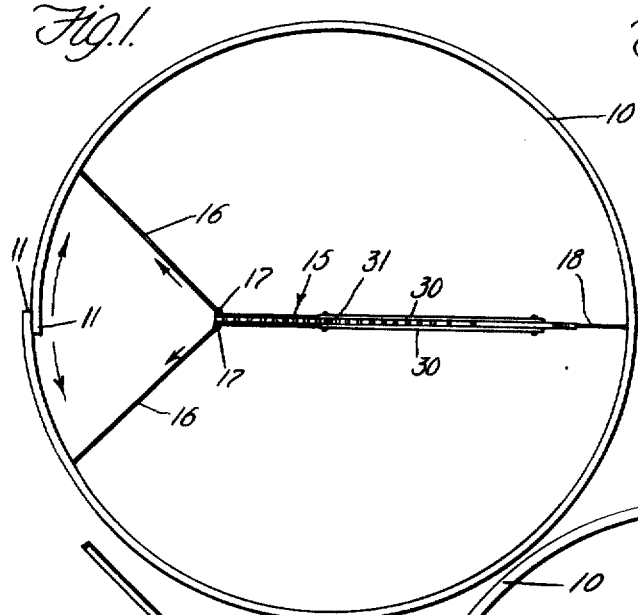
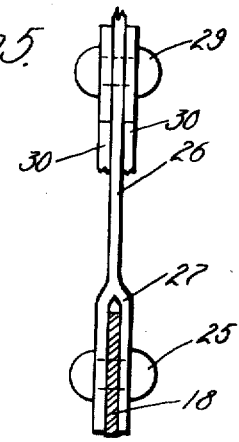
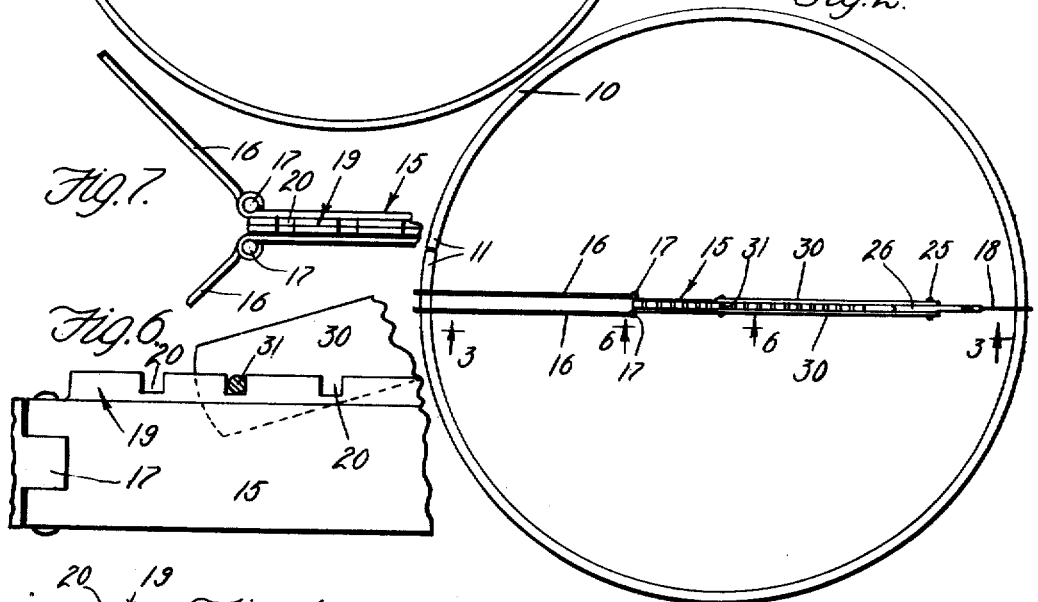
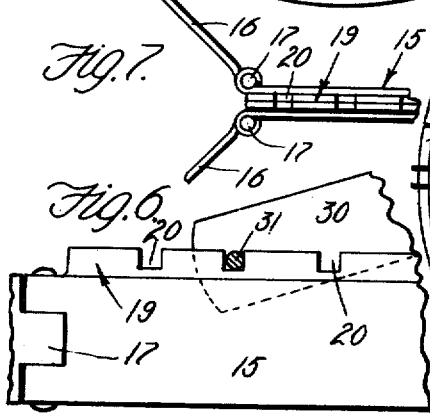
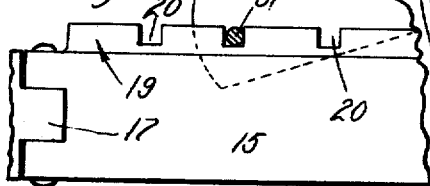
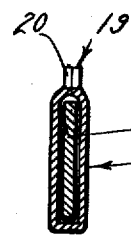
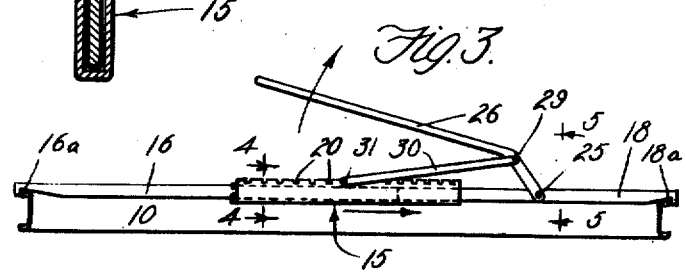
Inventor
Charles Bascom Howell
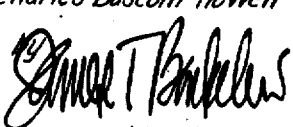
his Attorney

UNITED STATES PATENT OFFICE.

CHARLES BASCOM HOWELL, OF LOS ANGELES, CALIFORNIA.

RIM EXPANDING AND CONTRACTING TOOL.

1,317,136.     Specification of Letters Patent.     Patented Sept. 23, 1919.

Application filed March 28, 1918. Serial No. 225,199.

*To all whom it may concern:*

Be it known that I, CHARLES BASCOM HOWELL, a citizen of the United States, residing at Los Angeles, in the county of Los Angeles, State of California, have invented new and useful Improvements in Rim Expanding and Contracting Tools, of which the following is a specification.

This invention relates to tools or devices adapted for use in expanding and contracting rims such as are used for demountable rims for automobile tires; and it is an object of this invention to provide a simple, effective and powerful form of instrument for the purposes stated.

This tool is applicable to any form of contractive and expansive rim. Some such rims are formed entirely of a single ring-shaped element having abutting ends; others are formed with two endless side-rings or flanges and a central rim member which has abutting ends; and in any such construction it is necessary to contract and expand the member which has abutting ends, in order to take off or put on a tire.

There are several advantages of my improved device over those which are now in use; and these advantages, and the features of construction and operation by which the advantages are obtained, will best appear from the following specification, wherein I describe in detail a preferred form of my improved device, reference being had for this purpose to the accompanying drawings in which Figure 1 is a plan showing the application of my device to a rim for the purpose of expanding it; Fig. 2 is a similar view showing the application of the device for the purpose of contracting the rim; Fig. 3 is a section taken as indicated by line 3—3 on Fig. 2; Fig. 4 is an enlarged detail section taken on line 4—4 of Fig. 3; Fig. 5 is an enlarged section taken as indicated by line 5—5 on Fig. 3; Fig. 6 is an enlarged view taken in the aspect indicated by line 6—6 on Fig. 2; and Fig. 7 is an enlarged plan of certain parts as shown in Fig. 1.

In the drawings the numeral 10 designates any typical rim or rim member which has abutting ends 11. These ends 11 are usually provided with some means for locking or securing them in proper abutted alinement when they are in the position shown in Fig. 2; but such securing or locking means has nothing to with the present invention.

My improved device preferably comprises a sliding member 15 carrying at one end two arms 16 hinged to the body at 17, and sliding on a bar 18 which projects out of the other end of member 15. This member 15 may preferably be made of sheet or plate metal bent to the flat tubular form shown in Fig. 4 so as to form an inclosing box-shaped slider on the bar 18. In other words, the bar 18 and the member 15 are telescopically connected, the bar 18 sliding freely through the member 15 and in certain positions projecting at both ends beyond said member. At its upper edges this sheet or plate metal which forms member 15 is bent inwardly, and the edges laid together, so as to form a web 19 in which notches 20 are cut or otherwise formed, for the purpose hereinafter described.

Upon the bar 18 I mount a pivot 25 to carry a lever 26 adapted to be operated by hand. This lever is preferably bifurcated at 27 to extend on opposite sides of bar 18. At 29 a pair of thrust bars 30 is pivoted to lever 26; and these thrust bars 30 carry between their other ends a pin, or other equivalent member, as shown at 31 which is adapted to engage in the notches 20 in member 15. From the description here given, and from inspection of Fig. 3 of the drawings, it will be readily seen that movement of lever 26 about its pivot 25, with the pin 31 set in a notch 20, will cause relative sliding or longitudinal movement of bar 18 and slider 15. Bar 18 is provided with a hook 18ª on its end while arms 16 are provided with hooks 16ª on their ends, said hooks adapted to hook over the rim 10. When the device is being used to contract a rim, it is placed upon the rim in the position shown in Figs. 2 and 3, with the arms 16 swung inwardly close together to engage a part of the rim close to one of the ends 11, and the hook 18ª engaged over and opposite part of the rim. The pin 31 having been dropped into an appropriate notch 20, movement of the lever 26 in the direction indicated by the arrow in Fig. 3 will then move slider 15 in the direction indicated by the arrow, and thus have the effect of pulling the opposite engaged portions of the rim toward each other. This will cause the end of the rim to be pulled inwardly so that one end of the rim will slip inwardly past the other end and allow the rim to be contracted. Once one end of the rim has passed inwardly and slipped inside the other end of the rim, the rim may then be easily contracted sufficiently to remove it from inside a tire. The device may be easily applied and adjusted at any appropriate point on the rim, and the pin 31 may always be easily dropped into any appropriate notch 20, to give the maximum effective movement and to give the maximum effective application of power. If one movement of the lever 26 does not suffice, with the pin 31 placed in any one particular notch, the pin is easily moved from notch to notch without the necessity of removing the device from the rim, or of changing its position in any way. But the device is so proportioned that one movement is usually sufficient.

It will be noted that all of the strains put upon the different members of this device are centrally distributed and balanced. Pin 31 bears centrally (substantially in the central vertical plane of the device) upon member 15. Pin 31 is carried by two thrust bars 30 which connect with the lever 26, located directly over the bar 18; and bar 18 is in direct central line with member 15 and with the two arms 16.

When the device is used to expand a rim the ends of slide bar 18 and of arms 16 are placed against the interior surface of the rim, as is indicated in Fig. 1. The arms 16 are spread apart and are put on opposite sides of the abutting ends 11; so that as thrust pressure is put upon the arms 16, in the directions indicated by the arrows in Fig. 1, there is a tendency not only to push the end parts 11 radially outwardly, but also to move and spread them in the opposite circumferential directions indicated by the arrows in Fig. 1. This action is of great importance; for it very greatly facilitates easy expansion of the rim.

When the parts are in the position shown in Fig. 1, the pin 31 is placed in an appropriate notch and the lever 26 is moved in a direction opposite to that in which it is moved for contracting the rim. If one movement does not suffice, the pin may be easily moved from notch to notch without changing the position of the device. But usually one movement is amply sufficient for a complete operation of expanding or contracting a rim of any given size. The notches and pin afford very easy means of adjusting the device to different sizes of rims.

When the device is not in use, the arms 16 may be folded back around in a direction indicated by the arrows in Fig. 2, against member 15; and they are preferably made of about the same length as member 15 in order to facilitate folding of the device to the smallest possible length. The bar 18 is taken out of member 15 and the parts 26 and 30 are laid in position parallel to and against the bar 18. The whole device is then in compact form ready to be placed in the tool box.

It will be seen that the device is particularly easy to apply and adjust. There are no bolts, nuts, etc., to loosen and set each time the device is applied to a rim of different size. The tool is always ready for use on a rim of any size. And, furthermore, its application to a rim is easy because it has no loose parts that must be held in place by hand preparation to or during the operation.

From the foregoing detailed description of a preferred and specific form of my device my invention will be readily understood. Although I have proceeded to describe this preferred and specific form in some detail, I have done so for the purpose of rendering my device clearly understood rather than for the purpose of stating any limitations to my invention; and I accordingly reserve to myself all such changes and modifications as may suggest themselves to those skilled in the art or as may fall within the scope of the following claims.

Having described a preferred form of my invention, I claim:

1. In a device of the class described for expanding and contracting the metal rim of automobile tires the combination with two members extending in the same direction so secured together as to permit free relative longitudinal movement but to prevent relative movement in other directions, means at the outer opposite ends of said members for engaging a tire rim, a lever pivotally secured to one of said members and means for detachably connecting said lever at a point removed from its pivot to the other member whereby turning the lever will cause a relative longitudinal movement of the members.

2. In a device of the class described for expanding and contracting the metal rim of automobile tires the combination with two members extending in the same direction so secured together as to permit free relative longitudinal movement but to prevent relative movement in other directions, means at the outer end of one of said members to engage a tire rim, two arms so pivoted to the opposite end of the other member as to assume any desired angular position from that close against the sides of the member to a parallel position in prolongation thereof, the said arms having means at their outer ends for engaging the rim, a lever pivotally secured to one of said members and means for detachably connecting said lever at a point removed from its pivot to the other member whereby turning the lever will cause a relative longitudinal movement of the members.

3. In a device of the class described for expanding and contracting the metal rim of automobile tires the combination with two members telescoping each other permitting free relative longitudinal movement, the telescoping portions being of sufficient extent to maintain the alinement and prevent undue bending and binding under stress, means at the outer end of one member for engaging the rim, two arms hinged to the opposite end of the other member having means at their outer ends for engaging the rim, a lever pivotally secured to one of said members, a thrust bar or link pivoted at one end of said lever at a point removed from its pivot, and means for detachably engaging the opposite end of said thrust bar with the other member at different points whereby turning the lever will cause a relative longitudinal movement of said members in either direction.

4. In a device of the class described for expanding and contracting the metal rim of automobile tires the combination with two telescoping bars, one being in the form of a flat member and the other in the form of a flattened tube fitting the first member and permitting free relative longitudinal movement, the said flat member having means at its outer end for engaging the rim and the said tubular member having notches or projections on its upper surface, two flat arms pivotally secured to the end of said tubular member and adapted to be folded against the sides of said member or to any angular position and having means at their outer ends for engaging the rim, a lever pivoted to said flat member near its free end, and a thrust member or link pivoted to said lever at a point removed from its pivot having at its free end means for engaging said notches or projections in said tubular member.

5. In a device of the class described for expanding and contracting the metal rim of automobile tires the combination with two telescoping members freely movable longitudinally with reference to each other, the inner member having means at one end for engaging the rim, two arms pivoted to the end of the outer tubular member and adapted to constitute a continuation thereof or to fold back against the sides thereof, a lever pivoted to said inner member near its free end and adapted to be folded down to said telescoping members when not in operation, a thrust bar or link pivoted to said lever having at its free end means for engaging said outer tubular member in different positions whereby turning the lever will cause relative longitudinal movement of the telescoping members, the said thrust bar or link being so mounted as to be adapted to fold in against said lever when not in use.

In witness that I claim the foregoing I have hereunto subscribed my name this 22d day of March, 1918.

CHARLES BASCOM HOWELL.

Witness:
VIRGINIA I. BERINGER.